US007377502B2

(12) United States Patent
Nikolic

(10) Patent No.: US 7,377,502 B2
(45) Date of Patent: May 27, 2008

(54) UNIVERSAL VEHICLE ENGINE, GEARBOX AND LIKE STAND

(76) Inventor: Ljubomir Nikolic, 26 Bellevliet Street, Bothasig (ZA) 7441

( * ) Notice: Subject to any disclaimer, the term of this patent is extended or adjusted under 35 U.S.C. 154(b) by 0 days.

(21) Appl. No.: 10/590,048

(22) PCT Filed: Feb. 29, 2004

(86) PCT No.: PCT/IB2004/000524

§ 371 (c)(1),
(2), (4) Date: Aug. 22, 2006

(87) PCT Pub. No.: WO2005/028164

PCT Pub. Date: Mar. 31, 2005

(65) Prior Publication Data

US 2007/0170628 A1 Jul. 26, 2007

(51) Int. Cl.
*B23Q 1/25* (2006.01)

(52) U.S. Cl. .......................................... 269/17; 269/55

(58) Field of Classification Search .................. 269/17, 269/126-129, 47, 50, 55; 254/2 B, 133 R, 254/134, DIG. 16

See application file for complete search history.

(56) References Cited

U.S. PATENT DOCUMENTS

| | | | | |
|---|---|---|---|---|
| 1,812,585 | A * | 6/1931 | Collins | 269/59 |
| 2,490,858 | A | 12/1949 | Deddo | |
| 3,765,667 | A | 10/1973 | Christiansen | |
| 4,705,264 | A * | 11/1987 | Hawkins et al. | 269/17 |
| 6,322,061 | B1 * | 11/2001 | Maser et al. | 269/17 |
| 7,237,758 | B2 * | 7/2007 | Nikolic | 248/676 |
| 2003/0062663 | A1 * | 4/2003 | Fox | 269/17 |
| 2007/0170628 | A1 * | 7/2007 | Nikolic | 269/55 |

FOREIGN PATENT DOCUMENTS

| | | |
|---|---|---|
| DE | 689 849 C | 4/1940 |
| DE | 100 29 159 A | 1/2002 |

* cited by examiner

*Primary Examiner*—Lee D Wilson

(57) ABSTRACT

A stand comprising a bar adjustably connected to two opposite placed existing carrying plats being adjustably connected to respective bolts a adjustable handle engaging the bar and two existing handles engaging to respective carrying plats to holding engine and gearbox from three directions; two L-shaped bars adjustably engaged with two pairs of bolts, two pairs of long bolts, two pairs of frames and two supports forming support for engine while engine is on the stand released of the handles enabling a rear engine plate and fly wheel to be removed and returned without removing engine from stand; further enabling secure holding of engine regardless of type, size and weight thereof, and centring engine without adapters.

8 Claims, 4 Drawing Sheets

UNIVERSAL VEHICLE ENGINE, GEARBOX AND LIKE STAND

TECHNICAL FIELD

This invention relates to universal stand which provides secure holding various types of vehicle engines and gearboxes and allowing clear access to every side thereof during repair and renovation.

BACKGROUND ART

A type of prior art having an arm and provided with at least one hole and a plate holding engine or gearbox to their rear side, disable or substantially hinder access to rear side thereof such that certain parts must be removed form engine and gearbox (e.g. clutch, flywheel, oil seal, clutch release spring, realise arm, bearing guide sleeve) before they attached.

A type of prior art having two supports and carriers securing engine to two engine sides or ends substantially hinder or disable access to bolted sides of engine and position of carriers or supports may prevent full rotation of mounted engine if it has extended or coupled part(s) on its block.

Beside that some kind of engine stands (e.g. U.S. Pat. No. 1,812,585) requires considerable consumption of material and relatively expensive and complex mechanism must be provided especially for carriers.

Even a combine of the features of above types of prior arts could not satisfy a demand to enable access to all sides of engine and gearbox.

Invention U.S. Pat. No. 7,237,758 discloses the universal stand capable of holding various types of engines and gearboxes allowing clear access to every side thereof during repair and renovation.

Nevertheless, in said invention it is found that a rear engine plate, that some engines have and which positioned between engine block and fly wheel, cannot be removed from engine while engine is bolted on the stand.

Beside that, some engine have upper holes, which holes are used for bolting engine on the stand, positioned close to each other. In that case upper handles coupled on respective carrying plat have to be longer than lower handles also coupled on respective carrying plat and because of that may happened that upper handles may prevent the fly wheel being removed from or returned to engine while engine is on the stand.

Also some large engine have upper holes mentioned in previous paragraph positioned so close to lower holes that upper handles close to lower handles, i.e. the angle between each upper handle and corresponding lower handle is too small in what case engine may not be completely secure on the stand.

Also above mentioned invention requires usage of adapters to centre engines which is inconvenient.

The present invention is intended to provide and improved device to solve these problems.

DISCLOSURE OF THE INVENTION

It is a primary object of the present invention to provide an improved universal vehicle engine, gearbox and like stand that enables a rear engine plate to be removed from and returned to engine while engine is on the stand.

It is a second object of the present invention to provide an improved universal vehicle engine, gearbox and like stand that enables the flay wheel to be removed from and returned to engine while engine is on the stand regardless of type and size of engine.

It is another object of the present invention to provide an improved universal vehicle engine, gearbox and like stand that enables secure holding thereof on the stand regardless of type, size and weight thereof.

It is one more object of present invention to provides an improved universal vehicle engine, gearbox and like stand that enables easy centring of engine, gearbox and like without adapters.

The Invention Includes:

Standard mobile T-shaped base; two existing vertical support members one of which fixed on said base and stationary and another fixed on the existing foot and movable by said foot along the length of the leg of said base; two existing horizontal support members, each of said horizontal support members fixed on the top of respective vertical support member, said horizontal support members being the tubes, two existing rotatable adjustable arms having a existing plurality of holes defined in existing parallel circles along the length of each of said arms, each of said arms placed into respective horizontal support member; first ends of the arms facing towards each other; a existing pair of carrying plates; existing adjustable handles, each handle having an elongated slot to be adjustably attached on the respective plate, a carrier means and a crib.

Said carrier means includes two pairs of bolts, each of said pairs of bolts being fixed next to first end of said respective arm such that lengthwise axes of said bolts and said arms are parallel; a pair of adjustable connecting means, each of adjustable connecting means includes preferably an elongated slot established along the length thereof to adjustably receive said bolts fixed on respective arm to facilitate centring of engine, first end of adjustable connecting means being free and second end thereof fixed on the one side of the said respective carrying plate, each of said carrying plates includes a plurality of holes in lower part thereof to be adjustably coupled with adjustable handles and preferably a slot along the length of the upper part thereof to be adjustably coupled with a bar means. Said bar means having preferably two elongated slots established along the length thereof for better adjustment in relation to said carrying plates and to type and size of engine. Said bar means further includes at least one handle having an elongated slot and a tube welded on one end of the handle, the tube being extended from the edge of the handle for the thickness of the bar means.

The crib includes a pair of L-shaped bar members, each L-shaped bar member comprising preferably a plurality of holes defined horizontally in the vertical part thereof to adjustably engage with respective pair of said bolts fixed on respective arm and preferably plurality of holes defined in the horizontal part thereof, at least two pairs of frames and at least two pairs of long bolts, the upper ends of each pair of long bolts being adjustably engaged with holes defined in the horizontal part of said respective L-shaped bar member and the lower ends of each pair of long bolts being firmly coupled onto upper sides of said respective frames; at least a pair of supports, each of said supports threaded freely through opposite frames to relate to said L-shaped bar member to form a support for engine, gearbox and like when it should be needed kept on the stand released of the handles.

Further objectives and advantages of the present invention will become apparent from a detailed description provided herein below, with appropriate reference to accompanying drawings.

BEST MODE FOR CARRYING OUT THE INVENTION

Figure 1:
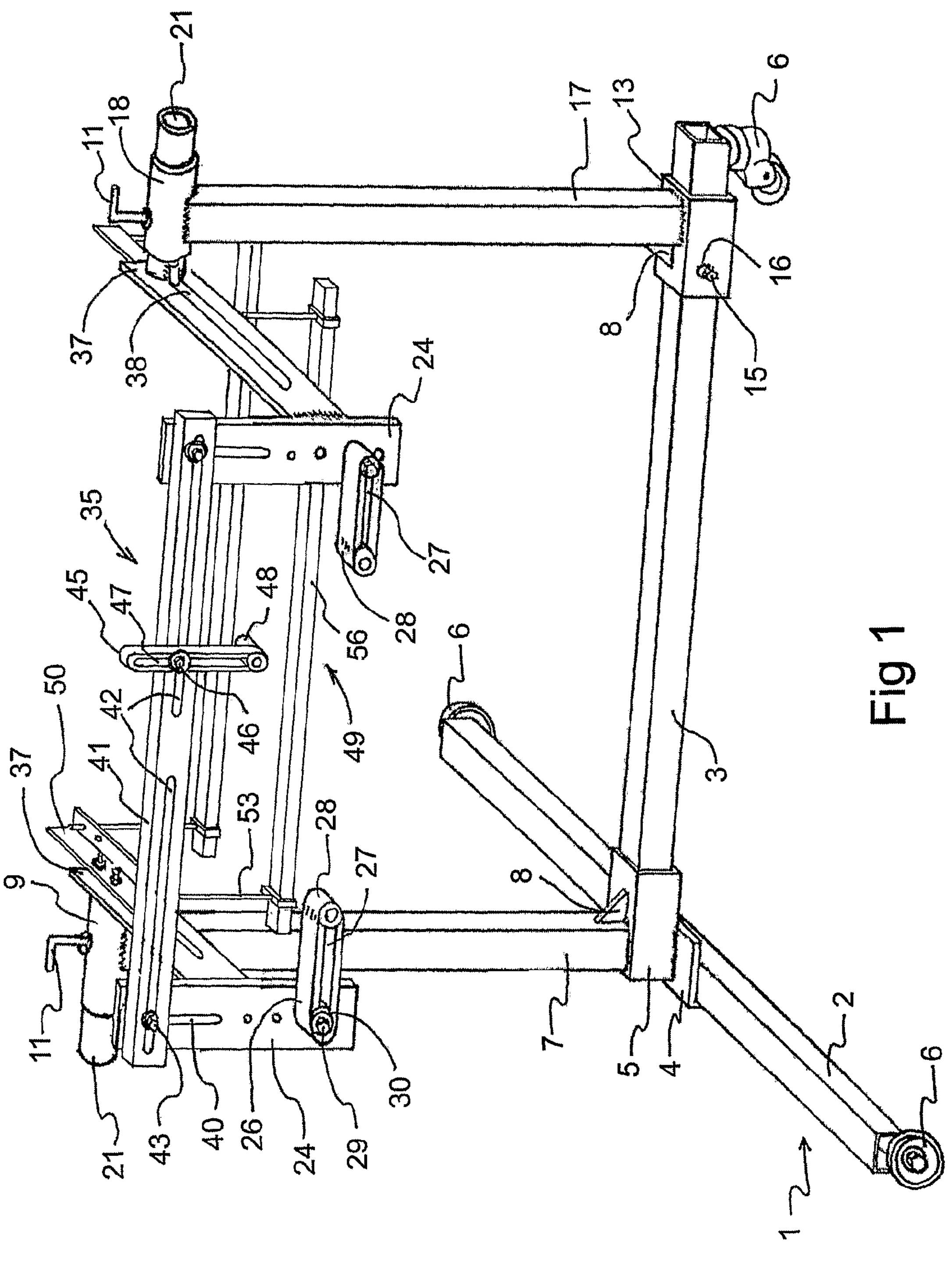
FIG. 1 is a perspective view of the assembled invention.

Reference will now be made in detail to the present preferred embodiment of invention, an example of which is illustrated in the accompanying drawings: Referring to FIG. 1 the present invention includes standard T-shaped base (1) rather placed on the wheels (6) one of which is rather castor. The base includes two legs (2,3) connected rather by a bolt with L-shaped means (4) and connecting means (5) which are, in illustrated embodiment, welded. The invention further includes two existing vertical supports (7, 17). The vertical support (7) is firmly connected to the connecting means (5) and being stationary, and the vertical support (17) is firmly connected to the existing foot (13). The foot (13) is placed rather around the leg (3) capable of moving along the length of the leg (3) and has existing locking means (15,16) provided to lock foot in desired position. Two existing horizontal supports (9, 18) are firmly connected to the respective tops of the vertical supports (7, 17) to receive respective existing rotatable adjustable arms (21). Each of the arms (21) has existing plurality of holes (22, FIG. 2) defined in existing parallel circles along the length of the arm (21).

Figure 2:
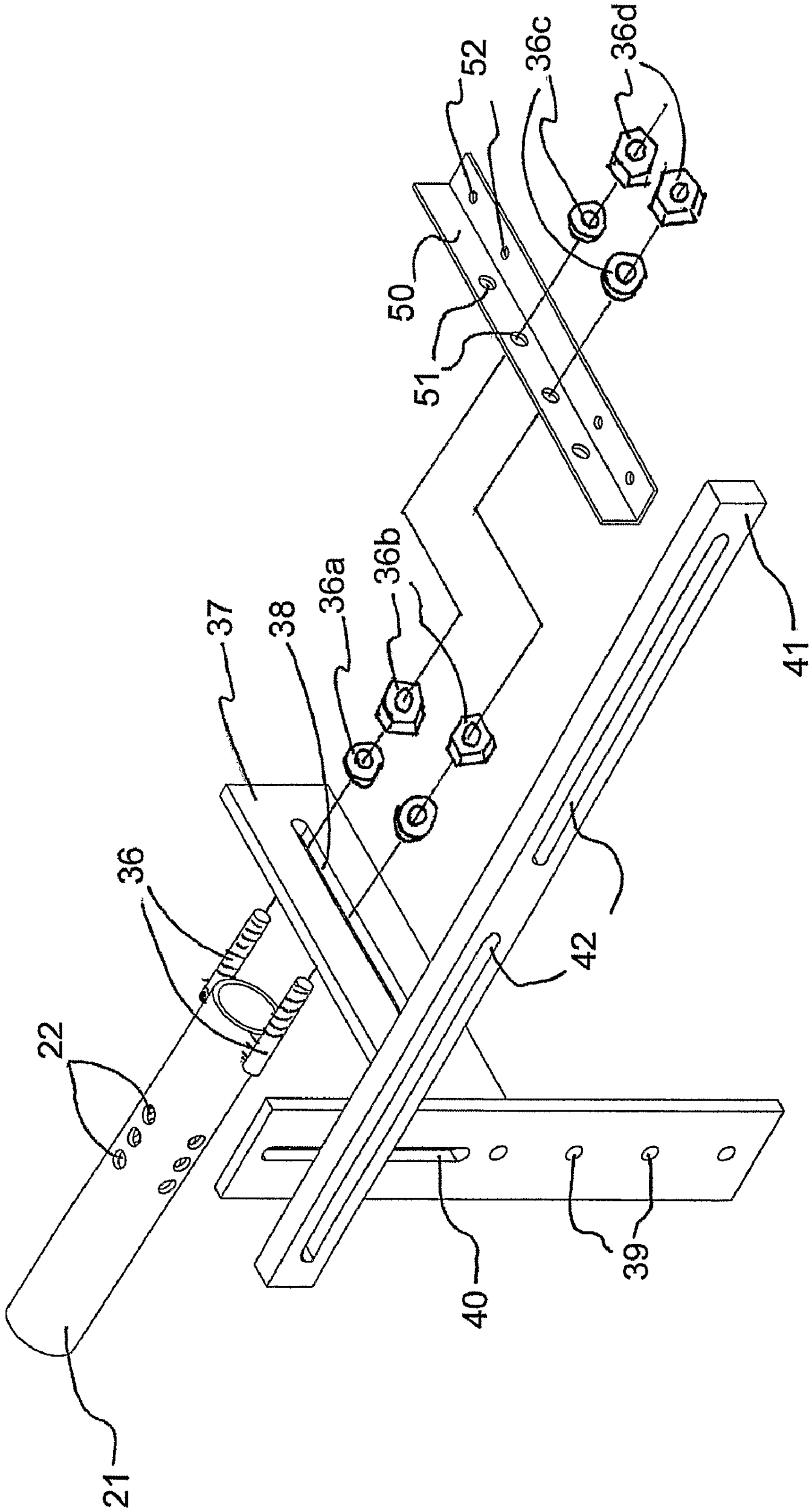
FIG. 2 is a partly exploded view of the carrier means with corresponding L-shaped bar member 50

As best shown in FIGS. 1 and 2. the invention includes a carrier means (35). The carrier means (35) comprises two pairs of bolts (36). The bolts (36) being without heads. Each of pair of bolts (36) is fixed on the respective rotatable adjustable arm (21) next to the first end of each amp in such a way that lengthwise axes of each pair of bolts (36) and of respective arm (21) are parallel. The first ends of arms (21) faced each other.

In accordance with the invention the carrier means (35) includes a pair of adjustable connecting means (37). Each of the pair of adjustable connecting means comprises preferably a slot (38) established along the length thereof to adjustably receive the respective pair of bolts (36) fixed on respective arm to facilitate centring of the engine gearbox and like. Two pairs of suitable washers (36*a*) respectively and two pairs of corresponding nuts (36*b*) respectively are located on bolts (36) to locks respective adjustable connecting means (37) in desired position. The first ends of the adjustable connecting means (37) stay free, and second ends thereof are fixed on the respective existing carrying plate (24). Each of carrying plates (24) includes preferably a plurality of holes (39) in the lower part thereof and preferably a slot (40) along the length of the upper part thereof for better and easier adjustability with the bar means (41) to be described. Each of the carrying plates (24) is provided with at least one existing adjustable handle (26).

Figure 3:
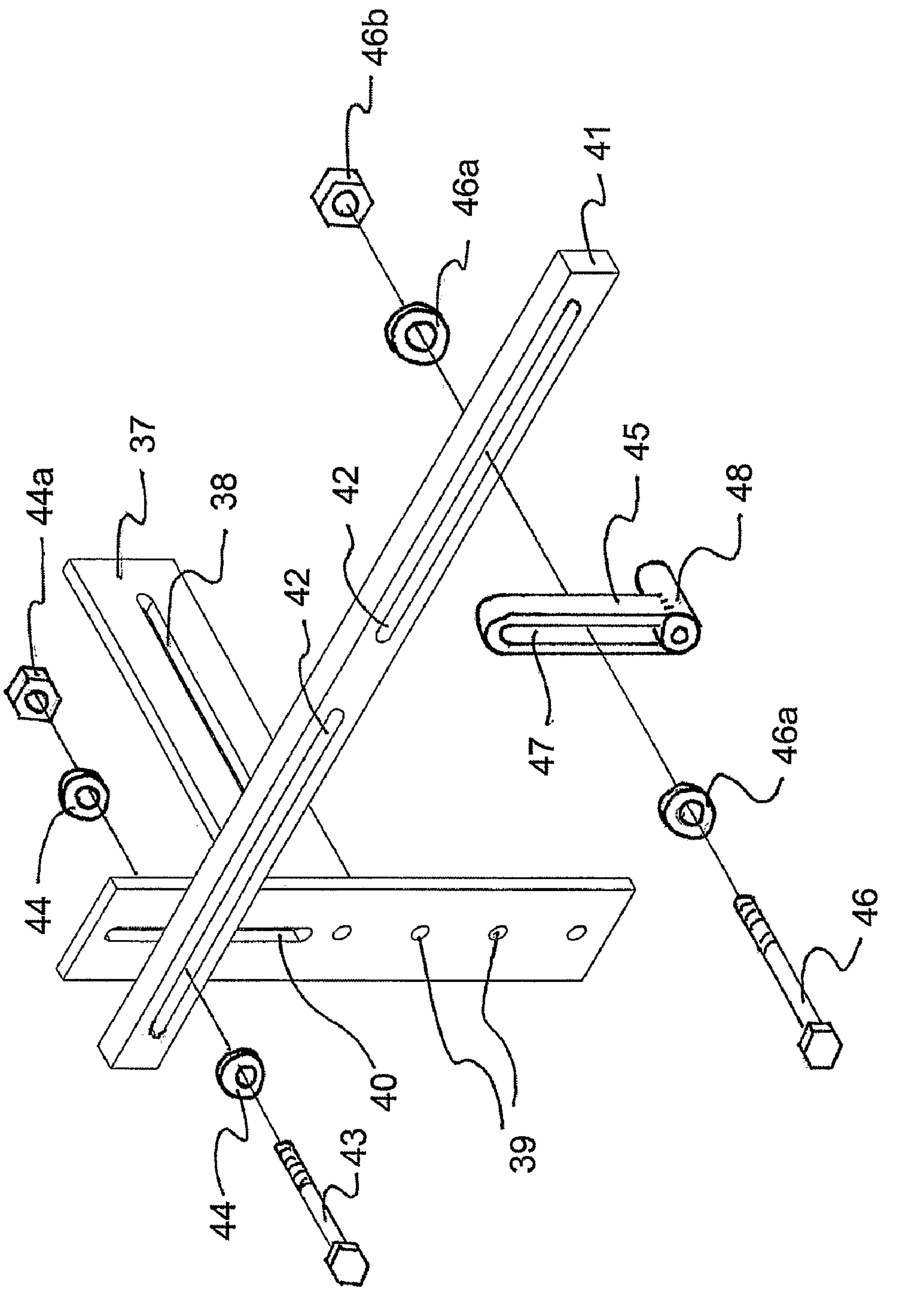
FIG. 3 partly exploded view of the carrier means with handle 45
Figure 4:
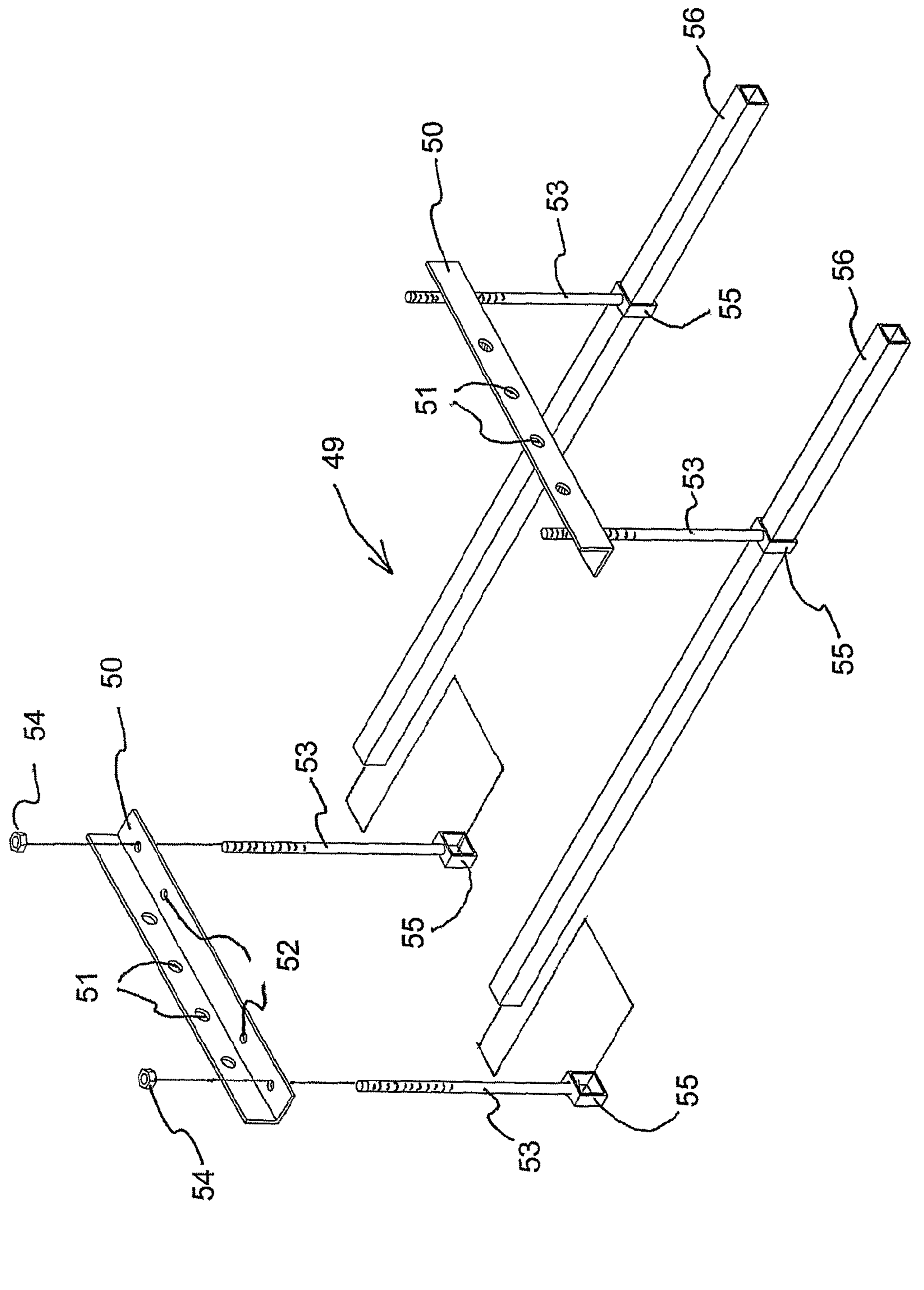
FIG. 4 explode view of the crib

In the illustrated embodiment the carrier means further includes a bar means (41). The bar means (41) has established rather two slots (42) aligned along the length thereof for the bar means (41) is to be stronger in the middle thereof and the bar means is to be adjustably coupled on the carrying plates (24) by corresponding bolts (43) which are secured by suitable washers (44 FIG. 3) and nuts (44*a* FIG. 3). The carrier means (35) includes at least one adjustable handle (45). The adjustable handle (45) has an elongated slot (47) to be adjustably coupled on the bar means (41) by corresponding bolt (46) and a tube (48) welded on one end of the handle (45). The tube is extended from the edge of the handle (45) for the thickness of the bar means (41) to be on the same plane with the handles (26) fixed on the carrying plates (24). As best shown in FIGS. 2 and 4 the stand includes a crib (49). The crib (49) comprises a pair of L-shaped bar members (50). Each L-shaped bar member (50) has preferably a plurality of holes (51) defined horizontally in the vertical part thereof to be adjustably engaged with respective bolts (36) fixed on the arms (21). Two pairs of suitable washers (36*c*) respectively and two pairs of corresponding nuts (36*d*) respectively are located on bolts (36) to lock L-shaped bar members (50) in desired position. Each L-shaped bar member (50) also has preferably a plurality of holes (52) defined in horizontal part thereof. The crib comprises at least two pairs of long bolts (53), each of the bolts (53) has an upper end and a lower end, upper ends of the bolts (53) are adjustably engaged with holes (52) defined in the horizontal parts of respective L-shaped bar members (50) and secured by suitable nuts (54). The crib (49) also includes at least two pairs of frames (55), the upper sides of the frames are firmly coupled with corresponding lower ends of the bolts (53); and at least a pair of supports (56), each support (56) is freely threaded through two opposite frames (55) to relate to L-shaped bar member (50) to form a support for engine, gearbox and the like when it should be needed kept on the stand released of the handles (26 and 45) In operation of the invention, as best seen in FIG. 1 when an engine is brought between the adjustable connecting means (37), locking means (15,16) of the foot (13) and the bolts (43) on the bar means are released to enable adjustment of distance between the vertical supports (7, 17) to correspond to the size and/or type of the engine. Once desired position of the toot (13) and of the bar means (41) is achieved the locking means (15, 16) on the foot (13) and the bolts (43) on the bar means respectively are tightened to prevent the displacement thereof. Afterwards position of adjustable handles (26, 45) on the carrying plates (24) and on the bar means (41) is adjusted such that the corresponding bolts threaded through the handles are to be received in the corresponding holes of engine and the bolts are tightened.

Engine to be easily manually rotated on the stand around its cross axis, cross axis of engine has to coincide with imaginary axes of rotatable adjustable arms (21). This coincidence is achieved by simple movement of the adjusting connecting means (37) on the bolts (36) fixed on the arms (21).

Should the engine have extended or coupled part(s) on the block side(s), which can be the case, the vertical support(s) (7 and/or 17) may prevent rotation of engine. Then desired distance between the vertical support(s) (7 and/or 17) and the involved engine can be reached by adjustable arm(s) (21).

In a case where engine has rear engine plate, the crib (49) is placed by L-shaped bar members (49) on corresponding bolts (36) to enable the removal of the plate from the engine while engine is on the stand. The position of the supports (56) in relation to engine is adjusted by long bolts (53) and once the fly wheel is removed from the engine, the bolts which connect the handles (26, 45) with the engine are released and engine remains on the supports (56) and rear engine plate is removed. Then the released bolts connecting the handles (26, 45) with the engine are tightened again and crib is removed.

Therefore present invention provides vehicle engine, gearbox and like is to be hold from three directions what enables secure holding thereof on the stand and provides every side thereof to be accessible to operator during repair and renovation regardless of the type, size and weight thereof. Also the invention provides fly wheel regardless of type of engine and rear engine plate to be removed from and retuned to engine while engine is on the stand and easy centring of engine, gearbox and like without use adapters.

The stand may be formed of any suitable material preferably of metal.

The invention provides an economical, mobile, simple, adjustable in many ways, practical, easy assembled and disassembled stand.

Although the invention has been explained in relation to its preferred embodiment, it is to be understood that may other possible modifications and variations can be made without departing from the spirit and scope of the invention as hereinafter claimed.

The invention claimed is:

1. A stand for holding an engine, gearbox and parts comprising said stand: standard T-shaped base (1); two vertical support members (7,17), the support member (7): fixed on said base (1) and stationary, the support member (17): fixed on the foot (13) and movable by said foot along a length of a leg (3) of said base (1); two horizontal support members (9,18), each of said horizontal support members (9,18) fixed on top of respective said vertical support member (7,17), said horizontal support members (9, 18) being tubes; two rotatable adjustable arms (21) having a plurality of holes (22) defined in parallel circles along a length of each of said arms (21), each of said arms placed into respective horizontal support member (9,18); a pair of carrying plates (24); adjustable handles (26), each handle having an elongated slot (27) adjustably attached on the said plate (24); a carrier means (35) including two pairs of bolts (36), each of said pairs of bolts (36) being fixed on the respective said rotatable adjustable arm (21) next to a first end of each said arm (21) in such a way that lengthwise axes of each pair of bolts (36) and of said respective said arm (21) are parallel; said carrier means including a pair of adjustable connecting means (37), each said adjustable connecting means includes an elongated slot (38) established along length thereof to adjustably receive corresponding bolts (36); said carrier means (35) including said pair of said carrying plates (24) including a plurality of holes (39) in the lower part thereof and a slot (40) along a length on the upper part thereof; said carrier means (35) including a bar means (41); said carrier means (35) including at least one handle (45), said handle (45) being adjustably coupled onto said bar means (41) by corresponding bolt (46)

said handle (45) having a tube (48) fixed on one end thereof; a crib (49) including a pair of L-shaped bar members (50); said crib (49) including at least two pairs of bolts (53); said crib (49) including at least two pairs of frames (55); said crib (49) including at least a pair of supports (56).

2. The stand of claim 1 therein each of said adjustable connecting means (37) having first end free and second end fixed on one side of said respective carrying plate (24).

3. The stand of claim 2 wherein said bar means (41) having two elongated slots (42) established along the length thereof to be adjustably coupled onto said carrying plates (24).

4. The stand of claim 3 wherein said tube (48) being extended from one edge of handle (45) for a thickness of the bar (41).

5. The stand of claim 1 wherein each of said L-shaped bar members (50) includes a plurality of holes (51), defined horizontally_in vertical part thereof to adjustably be engaged with the respective pair of said bolts (36), each L-shaped bar member (50) includes a plurality of holes (52) defined in the horizontal part thereof.

6. The stand of claim 5 wherein each of said bolts (53) having an upper end and a lower end, said tipper end of each bolt (53) being adjustably engaged with the corresponding hole (52) defined in the horizontal part of the respective L-shaped bar member (50).

7. The stand of claim 6 wherein each upper side of said frames (55) firmly coupled with lower end of corresponding long bolt (53).

8. The stand of claim 7 wherein each of said supports (56) threaded freely through two opposite frames (55) to relate to said pair of L-shaped bar members (50).

* * * * *